US006544574B2

(12) United States Patent
El-Khoury et al.

(10) Patent No.: US 6,544,574 B2
(45) Date of Patent: Apr. 8, 2003

(54) FOOD PREPARATION COMPOSITIONS

(76) Inventors: Nizar El-Khoury, The Procter & Gamble Company Winton Hill Technical Center, 6071 Center Hill Ave., Cincinnati, OH (US) 45224; Robert Leslie Swaine, Jr., The Procter & Gamble Company Winton Hill Technical Center, 6210 Center Hill Ave., Cincinnati, OH (US) 45224; Jessie Linda Sandy, The Procter & Gamble Company Winton Hill Technical Center, 6071 Center Hill Ave., Cincinnati, KY (US) 45224; Peter Yau-Tak Lin, The Procter & Gamble Company Winton Hill Technical Center, 6071 Center Hill Ave., Cincinnati, OH (US) 45224; David Alan Volker, The Procter & Gamble Company Winton Hill Technical Center, 6071 Center Hill Ave., Cincinnati, OH (US) 45224; John Keeney Howie, The Procter & Gamble Company Winton Hill Technical Center, 6071 Center Hill Ave., Cincinnati, OH (US) 45224; David Vincent Zyzak, The Procter & Gamble Company Winton HIll Technical Center, 6071 Center Hill Ave., Cincinnati, OH (US) 45224; Angela Louise Lair, The Procter & Gamble Company Winton Hill Technical Center, 6071 Center Hill Ave., Cincinnati, OH (US) 45224

( * ) Notice: Subject to any disclaimer, the term of this patent is extended or adjusted under 35 U.S.C. 154(b) by 0 days.

(21) Appl. No.: 09/960,067
(22) Filed: Sep. 21, 2001
(65) Prior Publication Data
US 2002/0045001 A1 Apr. 18, 2002

Related U.S. Application Data

(62) Division of application No. 09/557,123, filed on Apr. 25, 2000, now Pat. No. 6,403,144.
(60) Provisional application No. 60/131,956, filed on Apr. 30, 1999, provisional application No. 60/140,658, filed on Jun. 23, 1999, and provisional application No. 60/150,935, filed on Aug. 26, 1999.

(51) Int. Cl.⁷ .............................................. A23D 9/007
(52) U.S. Cl. ...................... 426/573; 426/601; 426/423; 426/609
(58) Field of Search .................... 426/601, 573, 426/423

(56) References Cited

U.S. PATENT DOCUMENTS

| 2,210,043 | A | | 8/1940 | Scherr ........................ 99/123 |
| 3,397,065 | A | | 8/1968 | Cunningham et al. ......... 99/90 |
| 3,619,213 | A | * | 11/1971 | Haynes et al. ............. 426/610 |
| 3,645,757 | A | | 2/1972 | Gordon et al. .......... 99/171 CA |
| 3,647,480 | A | | 3/1972 | Cermak ....................... 426/285 |
| 3,669,681 | A | * | 6/1972 | Shoaf ......................... 426/321 |
| 3,780,184 | A | | 12/1973 | Broderick et al. ............ 426/65 |
| 3,821,007 | A | | 6/1974 | Carey ........................... 106/150 |
| 3,863,013 | A | | 1/1975 | Wilson ....................... 426/535 |
| 3,896,975 | A | | 7/1975 | Follmer ...................... 222/192 |
| 3,906,117 | A | | 9/1975 | Gawrelow .................. 426/811 |
| T941,007 | I4 | | 12/1975 | Freeman et al. ........ 252/400 R |
| 3,949,094 | A | | 4/1976 | Johnson ........................ 426/99 |
| 3,949,096 | A | | 4/1976 | Johnson ....................... 426/302 |
| 3,973,053 | A | | 8/1976 | Galersky .................... 426/601 |
| 3,985,913 | A | | 10/1976 | Johnson et al. ............. 426/103 |
| 4,142,003 | A | | 2/1979 | Sejpal ......................... 426/662 |
| 4,169,901 | A | * | 10/1979 | Kravis ........................ 426/601 |
| 4,188,412 | A | | 2/1980 | Sejpal ......................... 426/609 |
| 4,192,898 | A | | 3/1980 | Hanson, Sr. ................ 426/250 |
| 4,207,347 | A | | 6/1980 | D'Atri ........................ 426/662 |
| 4,211,802 | A | | 7/1980 | Carey ......................... 426/609 |
| 4,260,528 | A | * | 4/1981 | Fox et al. |
| 4,283,429 | A | | 8/1981 | Todd et al. ................. 426/250 |
| 4,285,981 | A | | 8/1981 | Todd et al. ................. 426/250 |

(List continued on next page.)

FOREIGN PATENT DOCUMENTS

| EP | 0 021 483 | 6/1980 | ............ A23D/5/00 |
| EP | 0 157 531 | 10/1985 | ................. 426/609 |
| EP | 0 256 607 | 2/1988 | ............ C11B/5/00 |
| EP | 0 287 281 | 4/1988 | ............ A21D/8/08 |
| EP | 0 399 544 B1 | 5/1990 | ............ C12P/9/00 |
| EP | 0 495 510 A2 | 1/1992 | ............ C07F/9/02 |
| EP | 0 836 805 A1 | 10/1997 | .......... A23D/9/013 |
| EP | 0 201 041 | 11/1998 | ............ A23L/1/22 |
| GB | 1263390 | 5/1968 | ............ A23B/3/14 |
| GB | 2 021 629 A | 5/1979 | ............ A23D/5/00 |
| GB | 2 185 672 A | 1/1986 | ............ A23L/1/212 |
| WO | WO 91/05481 | 5/1991 | ............ A23D/9/00 |
| WO | WO 95/05748 | 3/1995 | ............ A23D/9/00 |
| WO | WO 95/32610 | 12/1995 | ............ A01G/1/04 |
| WO | WO 95/34222 | 12/1995 | ............ A23L/1/23 |
| WO | WO 96/10927 | 4/1996 | ............ A23L/1/226 |
| WO | WO 98/43497 | 10/1998 | ............ A23L/1/30 |

OTHER PUBLICATIONS

Kroschwitz, editor. 1995. Kirk–Othmer Encyclopedia of Chemical Technology, 4th edition, vol. 16, John Wiley & Sons, New York, p. 844–848.*

(List continued on next page.)

Primary Examiner—Carolyn Paden
(74) Attorney, Agent, or Firm—Calfee, Halter & Griswold LLP

(57) ABSTRACT

Disclosed are improved food preparation compositions. The compositions can include an anti-stick agent, a flavor enhancing agent, and an anti-foam agent. The compositions can be used in relatively low levels when preparing food, yet provide improved flavor, texture and aroma compared to results achieved using greater amounts of conventional food preparation compositions.

32 Claims, No Drawings

U.S. PATENT DOCUMENTS

| | | | |
|---|---|---|---|
| 4,339,465 A | 7/1982 | Strouss | 426/293 |
| 4,371,451 A | 2/1983 | Scotti et al. | 252/305 |
| 4,375,483 A * | 3/1983 | Shuford et al. | 426/330.6 |
| 4,399,165 A | 8/1983 | Tack | 426/613 |
| 4,420,496 A | 12/1983 | Hanson, Jr. et al. | 426/609 |
| 4,443,485 A | 4/1984 | Escher et al. | 426/538 |
| 4,479,977 A | 10/1984 | Dashiell et al. | 426/609 |
| 4,524,085 A | 6/1985 | Purves | 426/811 |
| 4,528,201 A | 7/1985 | Purves | 426/662 |
| 4,543,202 A | 9/1985 | Bartlett et al. | 252/305 |
| 4,547,388 A | 10/1985 | Strouss | 426/609 |
| 4,652,458 A * | 3/1987 | Frost et al. | 426/423 |
| 4,654,221 A | 3/1987 | Purves et al. | 426/609 |
| 4,670,267 A | 6/1987 | Chang et al. | 426/41 |
| 4,710,391 A | 12/1987 | Kirn et al. | 426/289 |
| 4,753,807 A | 6/1988 | Fuseya et al. | 426/99 |
| 4,806,370 A | 2/1989 | Toyota et al. | 426/99 |
| 4,842,881 A | 6/1989 | Kanemaru et al. | 426/307 |
| 4,849,019 A | 7/1989 | Yasukawa et al. | 106/244 |
| 4,871,558 A | 10/1989 | Tackikawa et al. | 426/99 |
| 4,889,740 A * | 12/1989 | Price | 426/417 |
| 4,963,368 A | 10/1990 | Antrim et al. | 424/498 |
| 4,976,984 A | 12/1990 | Yasukawa et al. | 426/602 |
| 4,988,527 A | 1/1991 | Buckholz, Jr. et al. | 426/536 |
| 5,064,678 A | 11/1991 | Kleman et al. | 426/611 |
| 5,092,964 A | 3/1992 | Conte, Jr. et al. | 203/29 |
| 5,100,684 A | 3/1992 | El-Nokaly et al. | |
| 5,156,876 A | 10/1992 | Clapp et al. | 426/609 |
| 5,183,750 A | 2/1993 | Nishide et al. | 435/134 |
| 5,192,572 A | 3/1993 | El-Nokaly et al. | |
| 5,296,021 A | 3/1994 | Clapp et al. | 106/2 |
| 5,338,563 A | 8/1994 | Mikulka et al. | 426/604 |
| 5,362,892 A | 11/1994 | Umeda et al. | 554/82 |
| 5,370,732 A | 12/1994 | Follmer | 106/244 |
| 5,374,434 A | 12/1994 | Clapp et al. | 426/609 |
| 5,387,658 A * | 2/1995 | Schroder et al. | 525/530 |
| 5,431,719 A | 7/1995 | Clapp et al. | 106/2 |
| 5,455,055 A | 10/1995 | Stoltz | 426/811 |
| 5,501,867 A | 3/1996 | Creehan et al. | 426/601 |
| 5,503,866 A | 4/1996 | Wilhelm, Jr. | 426/609 |
| 5,522,175 A | 6/1996 | Holtz | 47/11 |
| H1591 H * | 9/1996 | Fulcher | 426/601 |
| 5,567,456 A | 10/1996 | Clapp et al. | 426/116 |
| 5,607,715 A | 3/1997 | Beharry et al. | |
| 5,642,860 A | 7/1997 | Bush et al. | 239/333 |
| 5,650,185 A | 7/1997 | Stoltz | 426/811 |
| 5,650,190 A | 7/1997 | Buikstra et al. | 426/602 |
| 5,662,956 A | 9/1997 | Knightly | 426/601 |
| 5,674,549 A | 10/1997 | Chmiel et al. | 426/602 |
| 5,679,390 A | 10/1997 | Conover | 426/96 |
| 5,695,802 A | 12/1997 | Van Den Ouweland et al. | 426/533 |
| 5,709,048 A | 1/1998 | Holtz | 47/1.1 |
| 5,760,277 A | 6/1998 | Naef et al. | 560/121 |
| 5,780,090 A | 7/1998 | Freot et al. | 426/534 |
| 5,958,499 A * | 9/1999 | Desai et al. | 426/606 |
| 6,004,611 A | 12/1999 | Gotoh et al. | 426/612 |
| 6,022,579 A | 2/2000 | Mori et al. | 426/603 |
| 6,025,348 A | 2/2000 | Goto et al. | 514/182 |
| 6,113,970 A | 9/2000 | Rainey | 426/811 |
| 6,129,944 A | 10/2000 | Tiainen et al. | 426/577 |
| 6,210,743 B1 | 4/2001 | Clapp | 426/609 |

OTHER PUBLICATIONS

Stecher, P. G. editor. 1968. The Merck Index, eth edition. Merck & Co., Inc. Rahway, NJ. p. 945–946.*
Patent Abstracts of Japan, vol. 004, No. 140 (C–026), "Antioxidant Preparation", Publication No. 55089383, Publication Date: Jul. 5, 1980, Nippon Oil & Fats Co. Ltd.
Patent Abstracts of Japan, "Oil and Fat Composition", Publication No. 05244869, Publication Date: Sep. 24, 1993, Fuji Oil Co. Ltd.
Drozdowski, et al.: "Effects of polydimethyl siloxane on rapeseed oil transformation during deep frying" Journal of Food Lipids, vol. 6, No. 3, 1999, pp. 205–213.
"Butter–Flavored Alternative For Foodservice Captures real butter taste" (Accession No. 84 (08) :NO411 FSTA). Abstract from Food Engineering, (1983) 55 (7) 33.
"Mazola Pro Chef Non–Stick Spray for Fat Free Cooking—Original; Olive Oil Manufacturer: Bestfoods Category: Non–Stick Surfacing Products". (Accession No. 1998: 510710 Promt). Abstract from Product Alert, (Sep. 28, 1998).
"Mazola No Stick Butter Flavor Cooking Spray Manufacturer: Best Foods Category: Non Stick Surfacing Products". (Accession No. 97: 584437 Promt). Abstract from Product Alert, (Oct. 27, 1997).
"Choosing the Right Antifoam Agent for the Beverage Line". (Accession No. 90; 219930 Promt). Abstract from Beverage Industry, (May 1990) p. 11.
Parkin, A.R.: "Savoury Flavourings for Meat Products" Institute of Meat Bulletin, XP002145545 Abstract, vol. 75, Publication Date: 1972.
Charalambous, George: "Off–Flavors in Foods and Beverages" Development in Food Science, vol. 28, Publication Date: 1992, pp. 522–545.
Ashurst, P.R., et al.: "Thermal Process Flavorings" Food Flavorings, Second Edition, Publication Date: 1995, pp. 295–297.
Product label: Crisco No–Stick Cooking Spray—Natural Butter Flavor.
Product label: Crisco No–Stick Cooking Spray.
Product label: Professional Crisco—Pan Release.
Product label: Mazola No–Stick Corn Oil Cooking Spray.

* cited by examiner

FOOD PREPARATION COMPOSITIONS

PRIORITY CLAIM

This application is a divisional of U.S. application Ser. No. 09/557,123, filed Apr. 25, 2000, now U.S. Pat. No. 6,403,144 which claims the benefit of priority to U.S. Provisional Applications Ser. No. 60/131,956, filed Apr. 30, 1999; No. 60/140,658, filed Jun. 23, 1999; and No. 60/150,935, filed Aug. 26, 1999, all of which are herein incorporated by reference.

FIELD OF THE INVENTION

The present invention relates to food preparation compositions such as cooking oil, cooking spray, and shortening compositions, and to the use of such compositions in preparing foods.

BACKGROUND OF THE INVENTION

Food preparation compositions, such as cooking oils, cooking sprays, and shortenings are used in the preparation of cooked and fresh foods. Such cooked foods can include, but are not limited to, foods prepared by frying, baking, broiling, roasting, and the like. Conventional food preparation compositions can be applied to the cooking utensils, used as ingredients in baking, or can be used in marinating, frying, or sauteeing foods. Typically, conventional cooking oils and shortenings are employed to add flavor, texture, or color to food, and conventional cooking sprays are used to prevent sticking of the food to cooking utensils.

Recipes for food preparation often call out a desired level of cooking oil per amount of food being cooked. In order to achieve the desired effect of flavor and non-stick behavior, high levels of cooking oil are generally required. Such high levels of cooking oil result in high caloric intake due to the transfer of oil to the food being cooked. Further, such quantities of oil can result in splatter and mess in food preparation.

Flavored food preparation compositions, such as flavored cooking oils and cooking sprays, are commercially available. Such cooking sprays are generally not effective in transferring flavors and imparting desired texture to the cooked food; such cooking sprays can also cause excessive browning of the cooked food. Such cooking oils, while somewhat effective in transferring flavor to cooked food, typically add undesirable caloric content to the food.

"Compact oils" can be used in reduced amounts for cooking applications. Because less of the compact oil is needed for cooking, the cooked food products can contain fewer calories than those foods cooked with traditional oils. Compact oils can also contain anti-stick agents that prevent food from sticking to utensils during cooking. However, compact oils can produce an undesirable degree of foaming when used for pan and deep frying applications.

Accordingly, it would be desirable to provide a food preparation composition which imparts improved taste and texture to cooked foods relative to the taste and texture provided by conventional food preparation compositions, yet which can be used in reduced amounts (accordingly providing fewer calories and less fat) relative to conventional food preparation compositions (e.g. less than the amount of cooking oil called out in a recipe).

Additionally, it would be desirable to provide a compact oil that can be used for pan and deep frying applications without an undesired degree of foaming.

In addition, it would be desirable to have such a food preparation composition which can be used as a spray for releasing food from utensils, as an ingredient for cooking and baking, and which can be used to enhance the flavor of non-cooked foods.

It would also be desirable to provide a food preparation composition which minimizes splatter during cooking, which provides easy release of cooked materials from utensils for easy clean-up, and which provides flavor and texture enhancement of cooked foods without adding an excessive amount of calories to the cooked food.

It would also be desirable to provide a food preparation composition that browns food to a desired level but that does not brown food excessively as do some cooking sprays.

In addition, it would be desirable to provide a food preparation composition that does not exhibit an unacceptable degree of foaming when used for pan or deep frying.

SUMMARY OF THE INVENTION

Applicants have invented a food preparation composition that delivers full fat taste and texture to cooked food, yet imparts a reduced number of calories to the food relative to conventional food preparation compositions. In addition, the food preparation composition does not exhibit an unacceptable degree of foaming when used for pan or deep frying. The food preparation composition also has excellent anti-stick, anti-splatter, and controlled browning properties.

The food preparation composition of the present invention comprises: (a) at least one anti-stick agent; (b) at least one flavor enhancing agent; and (c) at least one anti-foam agent. Preferably, the food preparation composition also comprises at least one edible oil and can also contain a mouthfeel agent, such as an oxoacid and/or a diglyceride. A preferred anti-stick agent comprises lecithin, a silica compound, or mixtures thereof. Nucleotide flavor enhancers are the preferred flavor enhancing agents, with disodium guanylate, disodium inosinate, and mixtures thereof being especially preferred. A preferred anti-foaming agent comprises a silica compound, a silicone polymer, especially polydimethylsiloxane, or mixtures thereof.

The edible oil of the present invention can include an oil base comprising triglycerides, such as vegetable oil. The oil base can also comprise diglycerides or mixtures of diglycerides and triglycerides. Alternatively, the composition can have a base comprising a fat substitute, such as a polyol polyester (e.g. sucrose polyester such as olestra), or a combination of triglyceride oil and polyol polyester. The composition can comprise less than about 60%, more particularly less than about 35%, and in some embodiments less than about 10% water. Water can be added to make soluble some of the flavor agents and relatively small amounts of flavor precursors such as alpha amino acids, reducing compounds, and vitamins.

The food preparation composition can further comprise a flavoring agent or enhancer. Preferred flavoring enhancers include nucleotide flavor enhancers such as disodium guanylate, disodium inosinate, and mixtures thereof. Other suitable flavoring agents or enhancers can also be used.

The food preparation compositions of the present invention enhance the natural, inherent flavor of the food without the necessity of adding a dominant flavoring, which can be the case with conventional butter flavored sprays and spice flavored cooking oils. Accordingly, the food preparation compositions of the present invention can preferably be used to bring out the natural flavor of food. However, in some embodiments, they can be used with other flavor ingredients to provide specific desired flavoring (e.g., butter, olive oil, fried flavor notes, spicy, tangy, lemon, garlic, herb).

The compositions of the present invention, when used as a replacement for conventional cooking oils, can be used at an amount of up to about ¾ of the level (weight or volume) of typical cooking oils per unit weight of food to be cooked, and more preferably at up to about ⅔ of the level, and still more preferably at up to about ½ the level. In one embodiment, the compositions of the present invention can be used at from about ¼ to about ½ of the level of typical cooking oils. Further, at such reduced levels the compositions provide non-stick cooking benefits, better browning of food and controlled browning of the food preparation composition, less splattering when cooking, exhibits an acceptable degree of foaming, enhanced food flavor, and a desirable cooking aroma, but with a lower calorie content. Accordingly, the compositions of the present invention avoid the trade-off made in conventional food preparation compositions between flavor and texture on the one hand, and low calorie health benefits on the other hand. Additionally, foods cooked with the reduced amounts of the compositions of the present invention have enhanced flavor and texture relative to the same foods cooked in a greater amount of conventional food preparation compositions.

Accordingly, in one embodiment of the present invention, an article of commerce comprises a food preparation composition, a container for containing the composition, and a set of instructions associated with the container. The set of instructions direct the user to use an amount of the food preparation composition which is less than an amount of food preparation composition called for in a recipe or amount normally used. The instructions can direct the user to use up to about ¾, more particularly up to about ⅔, still more particularly up to about ½, and in one embodiment from about ¼ to about ½ of the amount of food preparation composition called for in a recipe or amount normally used. The set of instructions can be printed material attached directly or indirectly to the container, or alternatively, can be printed, electronic, or broadcast instructions associated with the container.

When silicone polymer is used in the composition as an anti-foam agent, the set of instructions can also direct the user to use an amount of the food preparation composition such that the level of silicone polymer present in the finished food product does not exceed FDA guidelines of 10 ppm (see 21 C.F.R. 173.340).

The food preparation composition of this invention is suitable for reducing fat in the diet, as it can be used in amounts of about one-half or less as compared to customary amounts used for digestible triglyceride fat. The food preparation composition can have a foam score of less than about 30; an egg stick score of from about 7 to about 10; a bread release score of less than about 4; a splatter score of less than about 4; and a browning score of less than about 30, preferably from about 5 to about 23.

The food preparation composition can be used in all applications that call for salad and cooking oil such as stove top cooking (pan frying, sauteing stir frying etc.), baking, and as an ingredient in recipes that are not cooked (salad dressing, mayonnaise).

The food preparation composition is not only useful as a replacement for salad and cooking oils, but it can also be used to formulate other edible fat products such as, but not limited to, shortening, peanut butter, peanut spread, mayonnaise, sauces, gravies, margarine, health bars, snacks, beverages, ice cream, yogurt, cake mix, frosting, donuts, baked goods (e.g., breads and muffins), cheese, and cheese spreads.

The present invention can also be provided in the form of a shortening. A typical shortening contains liquid triglyceride oil, an intermediate melting fraction triglyceride (IMF), a small amount of hardstock triglyceride and an emulsifier such as a monoglyceride. The compositions of the present invention can replace all or part of the liquid triglyceride oil and some of the intermediate melting fraction triglyceride and hardstock triglyceride. A shortening of this composition can be used at reduced levels relative to conventional shortening in all applications in which shortening is typically used. Food will not stick to pans and there will not be excessive foaming in frying applications. Because the present invention can be used at lower levels than conventional shortenings, the present invention provides the added benefit of reduced calorie/reduced fat relative to conventional shortenings.

In a preferred embodiment, the food preparation composition is delivered in the form of a stable gel, which is formed from the oil base. First, between about 1.5% and about 2.2%, preferably about 1.8% to about 2%, silica is added to the oil base. Preferably, a silica having less than about 3.5% moisture is used; silicas having higher moisture content can produce a final product which is too thick at room temperature. The silica is thoroughly mixed with the oil base, with the mixture being agitated until the silica is completely dispersed. Next, the mixture is homogenized using a high shear mixer, such as a Gaulin® mixer, preferably at pressures of at least about 2000 psi. The mixture is then cooled to from about 70° F. to about 80° F. to minimize oxidation. Additional ingredients, such as flavor enhancing agents, lecithin, and silicone polymer can then be added and thoroughly mixed until homogenous. The flavor enhancing agents are preferably ground to a relatively small particle size to enhance suspension of the particles in the oil carrier. The flavor enhancing agent particles can be ground to an average particle size of less than about 30 microns, more particularly less than about 20 microns, and in one embodiment less than about 10 microns for suspension in the matrix. The entire process from initial mixing of the silica and base oil through the addition of the additional ingredients is preferably performed under an inert atmosphere, such as a nitrogen atmosphere, to protect against oxidation.

Splatter scores for the food preparation composition of the present invention can be less than about 4 grams, preferably less than about 2 grams, and more preferably less than about 0.5 grams for chicken when analyzed according to the Splatter Test Method described in the Test Methods section herein. Splatter scores of less than about 2 grams, preferably less than about 1 gram, more preferably less than about 0.3 gram, and still more preferably less than about 0.15 gram can be obtained for mushrooms when analyzed according to the Splatter Test Method herein. For potatoes, splatter scores of less than about 1 gram, preferably less than about 0.5 gram, most preferably less than 0.1 gram, and still more preferably less than about 0.08 grams can be obtained when analyzed according to the Splatter Test Method herein.

The food preparation compositions of the present invention can have an egg anti-stick score of greater than about 7, preferably more than about 8, more preferably more than about 9, and most preferably more than about 9.5 analyzed according to the Egg Stick Measurement Method described in the Test Methods section herein.

Bread release scores for the food preparation composition of the present invention can be less than about 4 grams, preferably less than about 2 grams, more preferably less than about 1 gram, and most preferably less than 0.5 grams when analyzed according to the Bread Release Test Method described in the Test Methods section herein.

The food preparation compositions of the present invention preferably have foaming scores of less than about 30 mm, more preferably from about 5 mm to about 30 mm, even more preferably from about 0 mm to about 5 mm, and most preferably about 0 when analyzed according to the Pan Foaming Test Method described in the Test Methods section.

Browning of the food cooked in the food preparation composition of the present invention and/or browning of the food preparation composition itself is desirable as it leads to an appealing color and adds brown notes to the taste of the food. Excessive browning of either the food or the food preparation composition itself, however, is not desirable as too dark food is aesthetically not pleasing and can lead to the food preparer under cooking the food. Consumer testing with various foods and test cooking compositions have shown that consumers prefer cooking compositions which produce browning scores of from about 5 to about 23 when analyzed according to the Browning Test Method described in the Test Methods section herein.

DETAILED DESCRIPTION OF THE INVENTION

Definitions

As used herein, all percentages (%) are by weight, unless otherwise indicated.

As used herein, the term "food preparation composition" refers to compositions useful in preparing cooked and un-cooked foods, including but not limited to cooking oils, cooking sprays, shortenings, sauces, margarine and spreads, seasoning compositions, salad dressings, and marinades.

As used herein, reference to "instructions in association with" or "instructions associated with" a container means the instructions are either printed on the container itself, on a label on or attached to the container, or presented in a different manner including, but not limited to, brochures, printed advertisements, electronic advertisements, broadcast or internet advertisements, or other advertisements, so as to communicate the set of instructions to a consumer of the composition in the container.

As used herein, the term "oil" refers in general to pourable (at room temperature) edible oils derived from animals or plants, including but not limited to fish oils, liquefied animal fats, and vegetable oils, including but not limited to corn, coconut, soybean, olive, cottonseed, safflower oil, sunflower oil, canola, peanut oil, rice bran oil, corn fiber oil, grape seed oil, and combinations thereof (hydrogenated, non-hydrogenated, and partially hydrogenated oil). The oil can comprise a liquid, or a combination of liquid and solid particles (e.g., fat particles in a liquid base). Other oils can include diglycerides, either 1,2-diacyl glycerides with fatty acids esterified on the first and second hydroxyl groups of glycerin or 1,3-diacyl glycerides with fatty acids esterified on the first and third hydroxyl groups of glycerin. The 1,3-diacyl glycerides are most preferred. Suitable oil carriers comprising diglyceride are disclosed in U.S. Pat. Nos. 4,976,984 and 6,004,611, as well as European Published Application Nos. EP 378,833 A2 and EP 836,805 A1, all herein incorporated by reference. In addition, the term "oil" includes fat substitutes, which can be used alternatively or in combination with animal and/or plant oils. A suitable fat substitute is sucrose polyester, such as is available from the Procter & Gamble Co. under the trade name OLEAN®. The following U.S. Patents disclose fat substitutes, and are incorporated herein by reference: U.S. Pat. No. 4,880,657 issued Nov. 14, 1989; U.S. Pat. No. 4,960,602 issued Oct. 2, 1990; U.S. Pat. No. 4,835,001 issued May 30, 1989; U.S. Pat. No. 5,422,131 issued Jan. 2, 1996. Other suitable fat substitutes include SALATRIM® brand product from Nabisco and various alkoxylated polyols such as those described in the following U.S. Patents incorporated herein by reference: U.S. Pat. Nos. 4,983,329; 5,175,323; 5,288,884; 5,298,637; 5,362,894; 5,387,429; 5,446,843; 5,589,217; 5,597,605; 5,603,978; and 5,641,534.

As used herein, the term "compact oil" refers to an oil which can be used in reduced amounts, in comparison to traditional cooking oils, for cooking applications. Generally, the quantity of compact oil required can be about ¾ or less of that amount required for cooking with traditional cooking oil.

As used herein, the term "diglyceride" refers to esters of glycerol and fatty acids in which any two of the hydroxyl groups of the glycerol have been esterified with fatty acids. The fatty acids may be the same or different.

As used herein, the term "dairy diglyceride" refers to the diglyceride fraction resulting from the enzymatic or chemical hydrolysis of a dairy food such as milk, cream, butter, or cheese.

As used herein the terms "oxoacid" and "alpha keto acid" refer to a compound with the general structure:

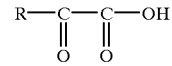

where R can represent hydrogen or a large variety of alkyl groups, saturated or unsaturated, linear or branched, optionally substituted by hydroxy, amino, phenyl, hydroxy-phenyl, carboxy, mercapto, methylthio, guanidino, and other groups. For instance, R can be a hydrocarbon chain, including straight and branched, preferably a hydrocarbon chain having from about 3 to about 10 carbon atoms.

As used herein, the term "lecithin" is a generic name for a class of phospholipids which are mixed esters of a polyhydric alcohol (usually but not always glycerol), which is esterified with fatty acids and with phosphoric acid. The phosphoric acid is, in turn, combined with a basic nitrogen-containing compound such as choline, serine or ethanolamine or with non-nitrogen containing compounds such as inositol. The term "lecithin" includes conventional lecithins, acylated (included acetylated) lecithins, and other suitable lecithin or lecithin-like compounds such as de-oiled lecithin, lysolecithins, phosphatidyl glecerol, diphosphatidyl geycerol, plasmalogen, phosphatidic acid and its salts, lyso-phosphatidic acid and its salts, and chemically and/or thermally rearranged lecithins such as a phosphatidal choline where one of the methyl groups on the quarternary nitorgen had been transferred to the phosphate group to form of a phosphate methyl ester, and mixtures thereof.

As used herein, the term "nucleotide flavor enhancer" includes 5'-ribonucleotides and their corresponding derivatives, such as salts thereof.

The Food Preparation Composition

The food preparation compositions of the present invention, when used at reduced levels compared to conventional cooking oils, provide taste and texture in cooked foods (savory food flavor, reduced oily/greasy mouthfeel, moistness, and crispiness) which is as good as or better than that provided by conventional cooking oils. Furthermore, the food preparation compositions of the present invention reduce sticking of food to utensils for easy clean-up. The food preparation compositions of the present invention provide anti-stick benefits which can be better than those provided by conventional cooking oils, and which can be comparable to those provided by conventional pan sprays (stick performance measured using the egg stick and bread release methods provided below). The food preparation compositions of the present invention also provide acceptable levels of foaming. Compositions that foam too much can foam over and allow oil to foam over the sides of a cooking vessel such as a frying pan or deep fryer. The food preparation compositions of the present invention can also provide better browning during cooking than is provided by conventional oils but without any of the over-browning that is sometimes provided by conventional cooking sprays, and exhibit less splattering than is typically exhibited by conventional cooking oils. The food preparation composition of the present invention can be used in a variety of food types, including but not limited to eggs, potatoes, chicken, beef, pork, mushrooms, cake, cookies, salad dressing, and muffins. Further, because the present invention can be used at lower levels than conventional cooking oils, the present invention provides the added benefit of reduced calorie/reduced fat relative to conventional cooking oils.

A. Anti-Stick Agent

The food preparation composition of the present invention can comprise an anti-stick agent, such as lecithin or modified lecithin (such as acetylated lecithin) for reducing the tendency of food to adhere to cooking utensils, and to provide browning. The composition can comprise up to about 20% lecithin, more particularly up to about 15% lecithin, still more particularly up to about 10% lecithin, and in one embodiment between about 0.5% and about 7% lecithin, more preferably between about 0.5% and about 4% lecithin. A suitable lecithin is commercially available from the Central Soya Co., as CENTROPHASE® 152 brand. A suitable acylated lecithin is the acetylated lecithin commercially available from the Central Soya Co. as CENTROPHASE® HR brand. Other suitable lecithin or lecithin-like compounds which can be used include de-oiled lecithin, lysolecithins, phosphatidic acid and its salts, and lysophosphatidic acid and its salts. Suitable lecithins can include those disclosed in U.S. Pat. Nos. 4,849,019; and 5,362,892; as well as in European Published Applications EP 287,281 A1 and EP 495,510 A3, incorporated herein by reference. A preferred phosphatidic acid salt composition is described in U.S. Pat. No. 5,183,750 as well as in European Published Application 399,544 A1, both of which are herein incorporated by reference. The phosphatidic acid salt is made by the enzymatic hydrolysis of lecithin and can be used at concentrations as low as 1%, preferably less than 0.6% in food preparation compositions of this invention.

The use of a silica compound, such as silicon dioxide, can also impart anti-stick properties to the food preparation composition. Especially preferred is the use of lecithin in combination with silicon dioxide for producing the desired anti-stick effects. Fumed silica is a preferred form of silicon dioxide. A suitable fumed silica is commercially available from Degussa, Inc., under the trade name Aerosil® 380. The composition can comprise up to about 10%, preferably up to about 5%, more preferably up to about 3%, and most preferably up to about 2%, of a silica compound or mixtures thereof.

Without being limited by theory, it is believed that lecithin, in the appropriate amount, can act synergistically with the oxoacids and flavor enhancing agents to deliver an improved brown/fried color and flavor to cooked foods.

B. Mouthfeel Agent

The food preparation composition of the present invention can comprise a mouthfeel agent for increasing the actual or perceived lubriciousness of the food cooked with the composition. In one embodiment of the present invention, the composition comprises diglyceride, oxoacids, or combinations thereof for providing a lubricious mouthfeel.

The composition can comprise between about 0.0005% to about 2% diglyceride. Suitable diglycerides include those from edible plant or animal precursors. A preferred diglyceride comprises dairy diglyceride. These mouthfeel diglycerides are in addition to the diglycerides that can be used as the base oil (oil carrier) for the food preparation compositions of the present invention.

The composition can comprise between about 0.05 ppm and about 50 ppm by weight oxoacid. The oxoacid can comprise oxopropanoic acid, oxobutanoic acid, oxopentanoic acid, oxohexanoic acid, oxoheptanoic acid, or mixtures thereof. The oxoacid can also comprise an oxoacid selected from the group consisting of glyoxilic acid, 2-oxopropanoic acid, 2 oxobutanoic acid, 3-methyl-2-oxobutanoic acid, 3-methyl-2-oxo-pentanoic acid, 4-methyl-2-oxo-pentanoic acid, 3-hydroxy-2-oxo-propanoic acid, 3-hydroxy-2-oxobutanoic acid, oxolacetic acid, 2-oxoglutaric acid, 2-oxo-3-phenylpropanoic acid, 3-(4-hydroxyphenyl)-2-oxopropanoic acid, 2-oxo-1H-indol-3-propanoic acid, 4-(methylthio)-2-oxo-pentanoic acid, 6-amino-2-oxo-hexanoic acid, 3-mercapto-2-oxo-propanoic acid, 3-methyl-2-oxo-hexanoic acid, 3-methyl-2-oxo-heptanoic acid, and mixtures thereof.

A suitable combination of dairy diglyceride and oxoacid having a butter flavor is available from the Firmenich Company of Geneva, Switzerland.

C. Flavor Enhancing Agent

The food preparation composition can comprise a flavor enhancing agent for accentuating the cooked flavor of the food prepared with the cooking composition. The flavor enhancing agent can be selected from nucleotide flavor enhancers such as 5'-IMP (5'-inosinic acid) and 5'-GMP (5'-guanylic acid), or their corresponding salts such as disodium guanylate, disodium inosinate, dipotassium guanylate, dipotassium inosinate, and mixtures thereof. Especially preferred are mixtures wherein the ratio of disodium guanylate to disodium inosinate is between about 1:0 to about 0:1, and more preferably from about 1:0 to about 0.5:0.5. A suitable 0.5:0.5 combination of disodium guanylate and disodium inosinate is commercially available from the Takeda Company, under the Ribotide® brand name.

Other suitable flavor enhancers include amino acid flavor enhancers such as monosodium glutamate (MSG), monopotassium glutamate, and mixtures thereof. Additional suitable flavor enhancers include, but are not limited to, maltol, ethyl maltol, nucleotide-containing compositions derived from shiitake or other suitable mushrooms, disodium succinate (SSA), suitable cultured whey proteins such as Flavor Whey (available from the PTX Corporation), and mixtures thereof Suitable yeast extracts, such as autolyzed yeast extracts (AYE), can also be used. Preferred yeast extracts are naturally rich in 5'-nucleotides and include Yeast Extract 2006 from the BioSpringer Company and Flavor Mate 950, Flavor Mate 960, and Flavor Mate 945, all available from Red Star BioProducts. Suitable carbohydrate decomposition products, such as Furaneol®, available from the Firmenich company, can also be used.

An especially preferred flavor enhancing agent comprises a combination of MSG with a nucleotide flavor enhancer such as disodium guanylate, disodium inosinate, or mixtures thereof.

The composition can comprise up to about 20% flavor enhancing agent, more particularly up to about 15%, still more particularly up to about 10%, in one embodiment between about 0.01% and about 7%, more preferably between about 0.01% and about 4% flavor enhancing agent, and still more preferably from about 0.01% to about 2% flavor enhancing agent.

D. Oil Carrier

In one embodiment of the present invention, the cooking composition can comprise an edible oil as an oil base (carrier). The edible oil can comprise between about 35% and about 99%, and preferably at least about 50%, of the food preparation composition. Preferred edible oils include triglycerides, diglycerides, and mixtures thereof.

Suitable oil carriers comprising predominantly 1,3-diacylglycerides are disclosed in U.S. Pat. Nos. 4,976,984 and 6,004,611, as well as European Published Application Nos. EP 378,893 A2 and EP 836,805 A1, all herein incorporated by reference.

Alternatively, or in combination with the oil, a fat substitute can be used in the base. A suitable fat substitute is sucrose polyester, such as is available from the Procter & Gamble Co. under the trade name OLEAN®. The following U.S. Patents disclose fat substitutes, and are incorporated herein by reference: U.S. Pat. No. 4,880,657 issued Nov. 14, 1989; U.S. Pat. No. 4,960,602 issued Oct. 2, 1990; U.S. Pat. No. 4,835,001 issued May 30, 1989; and U.S. Pat. No. 5,422,131 issued Jan. 2, 1996. Other suitable fat substitutes include SALATRIM® brand product from Nabisco and various alkoxylated polyols such as those described in the following U.S. Patents incorporated herein by reference: U.S. Pat. Nos. 4,983,329; 5,175,323; 5,288,884; 5,298,637; 5,362,894; 5,387,429; 5,446,843; 5,589,217; 5,597,605; 5,603,978; and 5,641,534.

Using a fat substitute as the base oil for this invention provides several benefits. First, it significantly reduces the total calories and the calories derived from fat. When a sucrose polyester such as Olean® is used as the base oil, the product contains essentially no calories or no calories from fat and zero grams trans fatty acids. The product can still be used at half the normal usage level of conventional fat. Using half as much significantly reduces the price per serving to the consumer.

A preferred embodiment uses a blend of liquid sucrose polyester and a structured triglyceride that is soluble in liquid sucrose polyester such as a triglyceride containing two liquid fatty acid chains (C2 to C10 saturated fatty acid chains or C16–C22 mono- or polyunsaturated chainlengths) and one solid fatty acid chains (C18–C24 saturated fatty acid chainlengths) as described in U.S. Pat. No. 5,419,925, Seiden, issued May 5, 1995 (equivalent to European Patent No. 390,410 B1) and incorporated herein by reference. Also preferred is Salatrim®, a structured triglyceride containing on average two short saturated fatty acid chainlengths (C2–C6) and one long saturated fatty acid chainlength (C18 to C22). In vivo lipolysis of the structured triglyceride hydrolyzes the fatty acid moieties from the 1 and 3 positions on the triglyceride leaving 2-monoglycerides. The resulting behenic acid, calcium salts of behenic acid and 2-monobehenin are poorly absorbed and serve as in vivo oil thickening agents for the liquid, nondigestible sucrose polyester and control oil loss. When a food preparation composition of the present invention is made from such a base oil, the final product has the visual appearance and aesthetics of the full fat version but delivers only about 15–25% of the total calories and fat calories.

The flavor enhancing agents, such as disodium guanylate and disodium inosinate, are generally insoluble in the edible oil. In order to suspend these flavor enhancing agents in the oil base, the oil base can be gelled, or thickened, to form a matrix which prevents flavor enhancers from settling. Materials that can be used for forming such a matrix include silicon dioxide, food grade waxes, or a matrix of fatty materials such as saturated triglycerides, sucrose polyester solids, oil insoluble fibers, or oil soluble polymers.

In a preferred embodiment, silica is used to form an oil base in the form of a stable gel. In the method for forming this stable gel, the processing steps and the order in which the silica is added are critical for obtaining a stable finished product where the solids do not separate from the liquid phase. First, between about 1.5% and about 2.2%, preferably about 1.8% to about 2%, silica (preferably fumed silica) is added to the oil base. Preferably, a silica having less than about 3.5% moisture is used; silicas having higher moisture content can produce a final product which is too thick at room temperature. The silica is thoroughly mixed with the oil base, with the mixture being agitated until the silica is completely dispersed. Next, the mixture is homogenized using a high shear mixer, such as a Gaulin® mixer, preferably at pressures of at least about 2000 psi. The mixture is then cooled to from about 70° F. to about 80° F. to minimize oxidation.

Additional ingredients, such as flavor enhancing agents, lecithin, and silicone polymer can then be added and thoroughly mixed until homogenous. The flavor enhancing agents are preferably ground to a relatively small particle size to enhance suspension of the particles in the oil carrier. The flavor enhancing agent particles can be ground to an average particle size of less than about 30 microns, more particularly less than about 20 microns, and in one embodiment less than about 10 microns for suspension in the matrix.

The present invention can also be in the form of a shortening. A typical shortening contains liquid triglyceride oil, an intermediate melting fraction triglyceride (IMF), a small amount of hardstock triglyceride and an emulsifier such as a monoglyceride. The compositions of the present invention can replace all or part of the liquid triglyceride oil and some of the intermediate melting fraction triglyceride and hardstock triglyceride. The food preparation compositions of the present invention, when used at reduced levels compared to conventional shortenings, can provide taste and texture in cooked foods (savory food flavor, reduced oily greasy mouthfeel, moistness, and crispiness) which are as good as or better than that provided with conventional shortenings. The food preparation compositions of the present invention can also provide faster browning during cooking than is provided by conventional shortenings, and exhibit less splattering than is typically exhibited by conventional shortenings. A shortening of this composition can be used at reduced levels relative to conventional shortening in all applications in which shortening is typically used. Food will not stick to pans and there will not be excessive foaming in frying applications. Because the present invention can be used at lower levels than conventional shortenings, the present invention provides the added benefit of reduces calorie/reduced fat relative to conventional shortenings.

The food preparation composition can be used in all applications that call for salad and cooking oil such as stove top cooking (i.e., pan frying, sauteing, stir frying, etc.), baking, and as an ingredient in recipes that are not cooked (i.e., salad dressing, mayonnaise).

The food preparation composition is not only useful as a replacement for salad and cooking oils, but it can also be used to formulate other edible fat products such as, but not limited to, shortening, peanut butter, peanut spread, mayonnaise, sauces, gravies, margarine, health bars, snacks, beverages, ice cream, yogurt, cake mix, frosting, donuts, baked goods (e.g., breads and muffins), cheese, and cheese spreads.

E. Anti-Foaming Agents

The food preparation composition can comprise silicone polymer to reduce the foaming of the composition during cooking. The silicone polymer is present at such as level as to have no detectable taste or aroma or flavor. The food preparation composition can comprise from about 1 ppm to about 1000 ppm, preferably from about 4 ppm to about 200 ppm, and more preferably about 10 ppm, silicone polymer.

A preferred silicone polymer is polydimethylsiloxane. Preferably, the polydimethylsiloxane has a viscosity of from about 200 to about 1200 centistokes at 25° C., more preferably from about 300 to about 1,050 centistokes at 25° C., and most preferably about 350 centistokes at 25° C. A particularly suitable commercially available polydimethylsiloxane is Dow® 200 Fluid brand, available from Dow Chemical Company.

The use of a silica compound, such as silicon dioxide, also imparts anti-foam properties to the food preparation composition. Especially preferred is the use of silicone polymer in combination with silicon dioxide for producing the desired anti-foam effects. Fumed silica is a preferred form of silicon dioxide. A suitable fumed silica is commercially available from Degussa, Inc., under the trade name Aerosil® 380. The composition can comprise up to about 10%, preferably up to about 5%, more preferably up to about 3%, and most preferably up to about 2%, of a silica compound or mixtures thereof.

F. Other Ingredients

Additional flavor ingredients and masking agents can be included in the food preparation composition. Such additional flavor and masking agents include, but are not limited to, terpene hydrocarbons and sunflower oil. Terpene hydrocarbons may be predominantly pure compounds, such as d-limonene; or byproducts of the citrus processing industry, such as cold pressed citrus oils (e.g., lemon, lime, orange, grapefruit, tangerine), citrus essence, or phase oils; or may be terpene mixtures separated from peel or essence oils by distillation or extraction. Natural and artificial meat flavors can also be used.

The compositions of the present invention can also include ingredients including, but not limited to, antioxidants, chelating agents, amino acids (e.g. alpha amino acids such as cysteine, methionine, lysine, and glycine), artificial and natural sweeteners including sugar (e.g., sucrose, fructose, xylose), vitamins (e.g., oil soluble Vitamins A, D, E and K, carotenoids, and water soluble Vitamins C and B), and other nutrients and minerals. For example, the compositions of the present invention can include flavor precursors such as alpha-amino acids, protein hydrolysates, reducing compounds, and mixtures thereof.

The compositions of the present invention can include one or more emulsifiers including, but not limited to, monoglycerides, diglycerol oleate, diglcerol linoleate, and/or coemulsifiers and cosolvents (e.g., ethanol). The compositions may also include an ingredient such as enzyme modified egg yolk for use in an oil in water emulsion.

The food preparation compositions of the present invention, according to one embodiment, can have a pH which is between about 4 and about 7, and more particularly between about 5 and about 6. Without being limited by theory, it is believed that such a pH range can be desirable to control browning of food prepared with the food preparation compositions of the present invention. The pH of the food preparation composition can be controlled by the addition of a suitable edible acid, such as citric acid. The addition of oil insoluble bicarbonate salts such as sodium or potassium bicarbonate can also reduce undesirable browning as well.

Performance Characteristics

A. Splatter Score

Splatter scores for the food preparation composition of the present invention can be less than about 4 grams, preferably less than about 2 grams, and more preferably less than about 0.5 grams for chicken when analyzed according to the Splatter Test Method described in the Test Methods section herein. Splatter scores of less than about 2 grams, preferably less than about 1 gram, more preferably less than about 0.3 gram, and still more preferably less than about 0.15 gram can be obtained for mushrooms when analyzed according to the Splatter Test Method herein. For potatoes, splatter scores of less than about 1 gram, preferably less than about 0.5 gram, most preferably less than 0.1 gram, and still more preferably less than about 0.08 grams can be obtained when analyzed according to the Splatter Test Method herein.

B. Anti-Stick Score

The food preparation compositions of the present invention can have an egg anti-stick score of greater than about 7, preferably more than about 8, more preferably more than about 9, and most preferably more than about 9.5 analyzed according to the Egg Stick Measurement Method described in the Test Methods section herein.

Bread release scores for the food preparation composition of the present invention can be less than about 4 grams, preferably less than about 2 grams, more preferably less than about 1 gram, and most preferably less than 0.5 grams when analyzed according to the Bread Release Test Method described in the Test Methods section herein.

C. Foaming Score

Foaming during frying is undesirable. Excessive foaming can lead to oil overflowing the cooking vessel, such as a frying pan, thus creating a potential safety hazard. The food preparation compositions of the present invention preferably have foaming scores of less than about 30 mm, more preferably from about 5 mm to about 30 mm, even more preferably from about 0 mm to about 5 mm, and most preferably about 0 when analyzed according to the Pan Foaming Test Method described in the Test Methods section.

D. Browning

Browning of the food cooked in the food preparation composition of the present invention and/or browning of the food preparation composition itself is desirable as it leads to an appealing color and adds brown notes to the taste of the food. Excessive browning of either the food or the food preparation composition itself, however, is not desirable as too dark food is aesthetically not pleasing and can lead to the food preparer under cooking the food. Consumer testing with various foods and test cooking compositions have shown that consumers prefer cooking compositions which produce browning scores of less than about 30, preferably from about 5 to about 23, when analyzed according to the Browning Test Method described in the Test Methods section herein.

The Article of Commerce

In one embodiment of the present invention, an article of commerce comprises a food preparation composition disposed within a container and a set of instructions. Generally, any container from which the food preparation can be dispensed, such as by pouring, spraying, or spreading, is suitable. Suitable containers include, but are not limited to, containers having glass, plastic, or multilayer constructions, including squeezable constructions, and having screw caps, snap caps, spray caps and/or pouring spouts, as are known in the art.

Accordingly, according to one embodiment of the present invention, the food preparation composition can be provided in a container, and a set of instructions can be associated with the container. The set of instructions direct the user to use an amount of the food preparation composition which is less than an amount of food preparation composition called for in a recipe or amount normally used. The instructions can direct the user to use up to about ¾, more particularly up to about ⅔, still more particularly up to about ½, and in one embodiment from about ¼ to about ½ of the amount of food preparation composition called for in a recipe or amount normally used. The set of instructions can be printed material attached directly or indirectly to the container, or alternatively, can be printed, electronic, or broadcast instructions associated with the container.

When silicone polymer is used in the composition as an anti-foam agent, the set of instructions can also direct the user to use an amount of the food preparation composition such that the level of silicone polymer present in the finished food product does not exceed FDA guidelines of 10 ppm (see 21 C.F.R. 173.340).

Test Methods
1. Egg Stick Measurement

This method can be used to assess the non-stick performance of a food preparation composition.

Equipment

Balance—measuring to the hundredth of a gram

Copper bottom stainless steel pans (7 in. diameter)

Electric stove with 4 inch burner

Temperature indicator

Cold eggs (large)

Cleaning Method for Pans

1. Clean skillet thoroughly with Comet® brand cleanser or equivalent, scrubbing for at least 30 seconds with a scour pad.
2. Rinse for about 30 seconds.
3. Turn skillet 90° for 10 seconds to assess if pan is clean. If water completely wets the pan surface, it is clean; go to step 5. If water beads up or does not wet the surface in certain areas, go to step 4.
4. Repeat steps 1–3 until surface is clean.
5. Dry with a paper towel.

Cooking

Turn the electric burner to medium high (a knob setting of ½ way between medium and high) and allow the heating element to come to an equilibrium temperature. Crack one egg into a 100 ml beaker and set aside. Spray the food preparation composition in a circular pattern into the skillet (or, alternatively, uniformly apply the food preparation composition with a paper towel or a pastry brush or the equivalent) until there is 0.55 gram to 0.65 gram of food preparation composition in the clean skillet, and heat on stove until the temperature indicator registers 365° F. Gently pour the egg from the beaker into the center of the pan. Cook the egg for 70 seconds, then remove the pan from the heat and turn the pan 90 degrees to evaluate sticking as described in the Table below. The % sticking on surface is estimated visually relative to the surface area occupied by the cooked egg before turning the pan. Repeat the test 10 times for each food preparation composition and average the results to determine an average egg sticking grade. This is the egg stick score.

| | | Evaluation of Sticking: | | |
|---|---|---|---|---|
| GRADE | PAN POSITION | % STICKING ON SURFACE | AMOUNT OF FORCE REQUIRED | RELEASE EFFICACY |
| 10 (Pass) | Pan held at 90° | 0% | No shaking of pan | 100% release |
| 9 (Pass) | Pan held at 90° | 1–6% | No shaking of pan | 94–99% release |
| | Pan held at 180° | 0% | | 100% release |
| 8 (Pass) | Pan at 180° for 0 sec | 1–6% | No shaking of pan | 94–99% release |
| | Pan at 180° for 5 sec | 0% | One slight shake* | 100% release |
| 7 | Pan at 180° for 5 sec | 7–24% | One slight shake | 76–93% release |
| 6 | Pan at 180° for 5 sec | 25–49% | Two hard shakes** | 51–75% release |
| 5 | Pan at 180° for 5 sec | 50–74% | Two hard shakes | 26–50% release |
| 4 | Pan at 180° for 5 sec | 75–99% | Two hard shakes | 1–25% release |
| 3 | Pan at 180° for 5 sec | 100% | Two hard shakes | 0% release crust remains, egg white and yolk come out |
| 2 | Pan at 180° for 5 sec | 100% | Two hard shakes | 0% release egg white remains, yolk comes out |
| 1 | Pan at 180° for 5 sec | 100% | Two hard shakes | 0% release egg white and yolk remain |

*A slight shake is defined as follows: With the handle in hand and the pan turned at a 180° angle and with the arm straight, bend the write upward until the top edge of the pan has been raised by 6 inches. Lower the pan back to the starting position over a period of 0.2 to 0.4 seconds.
**Same degree of movement as described for the slight shake but the pan is lowered back to the starting position in less than 0.1 seconds.

The compositions of the present invention can have an egg stick score of at least 7, preferably of at least 8, more preferably of at least 9 and most preferably of greater than 9.5 according to the scale above. For instance, compositions according to Example 17 can have a grade of about 9.6 in the egg stick measurement test described above when using the food preparation composition of Example 13.

2. Bread Release Test Method

This method can be used to assess the non-stick performance of a food preparation composition.

Equipment

- Oven with temperature controller and carousel
- Balance measuring to the hundredths place
- Electric Mixer with appropriate size Mixing Bowls and Blades, Sunbeam® Model 2360 or equivalent
- Tin Loaf Pans (7½"×3½"×2½"), not lined with anti-stick coating such as Teflon®.
- Oven Mitts or Hot pads for removing samples from oven
- Pillsbury® brand Banana Quick Bread Mix
- Water and Eggs for mix preparation
- Crisco® brand Vegetable Oil, or other 100% soybean oil or equivalent
- Food preparation compositions to be tested
- For Cleaning Pans: Comet® cleanser/Scotch Brite® Scouring Pad Procedure 1. Preheat oven to 350° F.
2. Using 396 g of the Pillsbury brand Banana Quick Bread Mix, add 240 g water, 42 g oil, and 102 g pre-mixed eggs (pre-mix eggs in blender). Batch can be doubled to ensure consistency.
3. Use electric mixer to combine ingredients. Mixing on speed 1 for 30 seconds and then speed 6 for 2 minutes scraping the walls of the bowl frequently.
4. Weigh loaf pan and record weight.
5. Spray each loaf pan using a side to side motion (start spraying the sides of the loaf pan first; then spray bottom of loaf pan second) or alternately brush the food preparation composition onto the sides and bottom of the loaf pan with a paper towel or a pastry brush so that the product is distributed evenly.
6. Total product to be used for the pan is 1.35 grams±0.05 grams.
7. Fill the loaf pan with 748.0–752.0 grams of batter. Record loaf pan+batter weight.
8. Bake for 60 minutes±1 minute at 350° F.±2° F.
9. Remove from oven and allow to cool for 15 minutes.
10. Weigh and record loaf pan+bread weight.
11. Invert loaf pans and shake to release bread (hold pan lengthwise), record shakes needed.
12. Weigh pan after releasing bread and record pan+residue weight.
13. Repeat steps 2–14 for a total of 4 pans.
14. Clean pan with Comet® and scouring pad (before using for another bread release test).
15. Determine and record bread % residue for each loaf pan as defined below. This is the bread release score.

$$\% \text{ residue} = \frac{\text{residue weight}}{\text{bread weight}} \times 100$$

Bread release scores for the food preparation composition of the present invention can be less than about 4 grams, preferably less than about 2 grams, and more preferably less than about 1 gram, and most preferably less than 0.5 grams when analyzed according to the Bread Release Test Method described above. The compositions of the present invention, when used according to the above bread release test, can exhibit a % residue of less than 1 percent. For instance compositions according to Example 1, below, can exhibit a % residue of about 0.23% and compositions of Example 3, exhibit a %residue of about 0.24%.

3. Splatter Test Method

Equipment

1. Aluminum foil (24 inches by 39 inches).
2. 12 inch by 12 inch square electric skillet (West Bend).

Procedure

1. Weigh and record the weight of the aluminum foil to the nearest 0.01 grams.
2. Place the skillet in the center of the foil.
3. Add the test oil to the skillet (21.0 grams for conventional oils, 10.5 grams for the compact oils of this invention) and heat the oils to the 350° F. Use a surface thermometer to measure temperatures.
4. Cook the amount of a given food for the specified time as described in the Technical Cooking Test Method found in Section 6 of the Test Methods Section.
5. Remove the food from the skillet when it has finished cooking and remove the skillet from the aluminum foil.
6. Weigh and record the weight of aluminum foil.

Calculation

1. Subtract the initial weight of the foil (step 1 in procedure) from the final weight of the foil (step 6 in procedure 1). This difference is the weight of oil that splattered out of the pan. This is the splatter score.
2. Divide the weight of oil splattered from the pan by the weight of oil used to cook the food and multiply the result by 100. This is the percentage of oil that splattered out of the pan.

Splatter scores for the food preparation composition of the present invention can be less than about 4 grams, preferably less than about 2 grams, and more preferably less than about 0.5 grams for chicken when analyzed according to the Splatter Test Method above. Splatter scores of less than about 2 grams, preferably less than about 1 gram, more preferably less than about 0.3 gram, and still more preferably less than about 0.15 gram can be obtained for mushrooms when analyzed according to the Splatter Test Method herein. For potatoes, splatter scores of less than about 1 gram, preferably less than about 0.5 gram, most preferably less than 0.1 gram, and still more preferably less than about 0.08 grams can be obtained when analyzed according to the Splatter Test Method herein. For instance compositions according to Example 14, when used according to the above splatter test, can exhibit a splatter score of less than 0.2 grams, less than 0.15 grams and less than 0.05 grams for chicken mushrooms and potatoes, respectively.

4. Pan Foaming Test Method

This method is used to quantitate the amount of foam generated when food preparation compositions of the present invention or conventional cooking oils are used in pan frying with large quantities of oil.

Equipment

- 10" Revereware® Stainless Pan
- 330 +/−5 grams of product
- 158 +/−1 gram of Oreida, Frozen Homestyle Hashbrowns (potatoes)
- Metal ruler with mm markings
- Thermocouple
- Electric household range Method
1. Adjust the temperature dial of one of the large burners (7.5 inch diameter) to maximum heat. Heat the oil to 360° F. stirring every thirty seconds.
2. Once the oil reaches 360° F. add the frozen potatoes and start the timer (keep the heat setting on maximum throughout the test). Caution! Formulations that contain surfactants but do not contain efficient anti-foaming components can foam out of the skillet when the potatoes are first added. Be prepared to immediately remove the skillet from the burner if severe foaming occurs.
3. At the 30 second mark measure and record the distance between the foam and the top of the skillet using the metal ruler. This distance is defined to be D1. All oil will bubble when moisture is added at this temperature. It is considered foam only if the entire surface of the oil is covered with foam.
4. Continue for two minutes and measure the outage at the end of this period.
5. Allow the oil to cool. Measure the distance between the oil and the top of the skillet. This distance is defined to be D2. Dispose of the used oil in a waste oil drum. Wash the pan with Dawn and water and dry with a paper towel.
6. The foam score is equal to D2–D1.

The food preparation compositions of the present invention preferably have foaming scores of less than about 30 mm, more preferably from about 5 mm to about 30 mm, even more preferably from about 0 mm to about 5 mm, and most preferably about 0 when analyzed according to the Pan Foaming Test Method described above. For instance compositions according to Example 16, when used according to the above foam test, can exhibit a foam score of 0 when both fumed silica and a silicone comprise the anti-foaming agent.

5. Browning Test Method

This method is used to quantitate the amount of browning occurring when food preparation compositions of the present invention or conventional cooking sprays are heated. Samples are heated under controlled conditions (355° F. for 10 minutes) in an oil bath, removed from the bath and quenched to rapidly bring them back to room temperature and then placed in a spectrophotometer and the color read on the FAC scale which is described in AOCS Analytical Method CC-13a-43.

Materials And Equipment Needed for Test
1. Vegetable Oil.
2. Other components to be included in formulation.
3. Test tube with copper wire hangers and lids.
4. Test tube hanging rank.
5. Circulating Oil bath with temperature controller (such as a Curten Matheson model 9110RH).
6. 600 mL beaker filled with 300 mL cold water.
7. Tintometer model PFX990 calorimeter or equivalent.
8. Acetone Heating
1. Turn on the oil bath and set temperature to 355° F. Allow bath to come up to this temperature and the temperature to stabilize.
2. Prepare formulations to be tested and record weights of each material in formulation
3. Label test tubes and test tube lids with formulation code and heating time.
4. Fill test tube with exactly 5 mL of formulation.
5. Hang test tube from rack so that sample is submerged.
6. Monitor sample during heating. If foaming occurs, remove sample before foam reaches the top of the test tube. This test method is not applicable to food preparation compositions that foam badly.
7. After exactly 10 minutes, remove the test tube from the oil bath and place in 600 mL beaker to cool.

Color Measurements
1. Turn on PFX990 calorimeter and allow to warm up for 30 min.
2. Check that cell path length is set to 1.00 cm. If not, change cell path length according to directions in user manual.
3. Calibrate colorimeter
   Check that chamber is empty
   Close chamber lid
   Push clear path button
   Push read button
   Check that FAC color reading is 0.0
   Record that instrument successfully calibrated in book
4. Check that glass cell is clean. Clean according to below if necessary. NOTE: GLASS CELLS SHOULD ONLY BE HANDLED ON SIDES THAT ARE CLOUDY
5. Fill 10 mm glass cell with ~2 mL of sample
6. Place sample in chamber and push read
7. Record color reading for FAC color scale. This is the browning score.
8. Empty sample into waste oil container and prepare to measure next sample. Clean glass cell if necessary.

Cleaning Glass Cells
1. Drain any oil into waste oil container
2. Fill glass cell with small amount of acetone
3. Use Q-tip to wash walls.
4. Dispose of acetone in waste solvent can.

Check that cell is clean. If necessary use soap and warm water to remove buildup.

The food preparation compositions of the present invention preferably have browning scores of from about 5 to about 23 when analyzed according to the Browning Test Method described above. For instance, compositions according to Example 18, when used according to the above browning test can exhibit a browning score of 21 and 19 when using the food preparation compositions of Examples 9 and 13, respectively.

Food preparation compositions of the present invention exhibit certain minimal criteria for performance test method scores. These minimal criteria are an egg stick score of greater than about 7, a bread release score of less than about 4, a foaming score of less than about 30, a splatter score of less than about 4, and a browning score of less than about 30. Certain food preparation compositions other than those of the present invention can simultaneously have up to three performance test method scores within the minimal ranges specified, but only food preparation compositions of the present invention can simultaneously have four or all five test scores within the minimal acceptable range.

6. Technical Cooking Test Methods

Food preparation compositions of the present invention can be compared to a conventional cooking oil (e.g. Crisco® Natural Blend brand, or other 88% canola/6% soy/6% sunflower oil or equivalent), at different usage levels. For example, four different food types (potatoes, eggs, mushrooms, and chicken) can be cooked with a food preparation composition of the present invention and the conventional cooking oil, with the following amounts of the food preparation composition of the present invention and the conventional cooking oil: 1) full amount—21 g; 2) 24% less—16 g; 3) 43% less—12 g; 4) 62% less—8 g; 5) 81% less—4 g.

The following technical observations and associated ratings can be made for each food type cooked with the various amounts of each of the food preparation composition of the present invention and the conventional oil:

1. Initial aroma: 1=no off-aroma; 2=mild noticeable off aroma; 3=extreme overpowering off-aroma
2. Browning during heating: 1=no; 2=yes
3. Smoking during heating: 1=no; 2=yes
4. Foaming during heating: 1=no foaming; 2=mild-foams & disappears at temperature; 3=extreme-foams & remains at temperature
5. Foaming during cooking: 1=1=no foaming; 2=mild-foams & disappears as cooked; 3=extreme-foams & remains during cooking process
6. Sticking: 1=none; 2=slight; 3=moderate; 4=extreme
7. Splattering: 1=none-no splattering during process; 2=slight-small amount in pan & on paper (brown paper is positioned to capture and visualize oil splatter); 3=moderate-medium amount in pan and on paper; 4=extreme-large amount in and on paper
8. Appearance of Food: 1=oily w/o any browning; 2=medium-oily w/light browning; 3=done-oily w/moderate browning; 4=burnt
9. Off-flavor of Food: 1=none; 2=moderate-noticeable amount; 3=extreme-overpowering amount
10. Overall Flavor: 1=bland; 2=savory; 3=too much
11. Oily/greasy mouthfeel: 1=none detected; 2=moderate-noticeable amount; 3=extreme-overpowering amount
12. Moisture level: 1=low-dry; 2=medium-juicy; 3=high-soggy
13. Texture: 1=tough; 2=tender; 3=crisp Cooking is done in West Bend® 12" non-stick electric skillet and 12" round Farberware® electric stainless steel skillets and 1 gram of salt is used in each preparation. The following methods can be used for each food type, with the above technical observations being made during cooking.

Chicken

Boneless, skinless chicken breast halves are rinsed, patted dry, trimmed, and then pounded to an even thickness of about ⅜". Breasts are then cut unto ½" wide strips and weighed out in 200 g portions for each execution. Set skillet temperature control to maintain 350° F. as measured by surface thermometer placed in center of skillet. Set timer for 3 minutes and add pre-weighed cooking product to skillet. Tilt pan to coat evenly, spreading with rubber scraper, if necessary. Toss and stir for about 20 seconds to coat evenly, then start timer. Cook chicken, stirring often, for 3 min. Remove chicken and place on plate.

Potatoes

Weigh 300±2 grams of Ore Ida Brand hashbrown potatoes (Southern Style). Add 21.2 grams of the food preparation composition of this invention or 42.5 grams of conventional salad and cooking oil into the skillet. Set temperature control to maintain 375° F. temperature as determined by surface thermometer in center of skillet. Set one timer for 15 minutes and another timer for 8 minutes. Add weighed cooking product to heated skillet and spread evenly over the entire surface of the skillet, then sprinkle 1.3 grams of salt over entire surface of potatoes, shape into a large patty and pat down with a spatula. Start timers. At the end of 8 minutes, divide potatoes with spatula into 4 sections of about equal size, then turn the sections over and pat with spatula. At the end of 15 minutes, remove potatoes from skillet and place on a plate.

Mushrooms

Rinse mushrooms, pat dry, and weigh 200 grams for cooking. Set skillet temperature control to maintain 350° F. with surface thermometer in center of skillet. Set timer for 3 minutes. Add weighed cooking product to heated skillet and tilt to coat evenly & spread with rubber scraper if necessary. Add mushrooms and sprinkle with salt. Stir for 20 seconds to coat evenly and start timer. Cook with stirring for 3 minutes Remove to plate.

Eggs (Scrambled)

Using large eggs, process eggs (1 dozen at a time) in Hamilton Beach Blender, pulsing off and on at lowest speed until blended. Weigh eggs into 200 gram samples. Set temperature control to maintain 310° F. temperature as measured by surface thermometer in center of skillet. Set timer for 1 minute. Add weighed cooking product to heated skillet. Tilt skillet to coat evenly and spread with rubber scraper, if necessary. Add 200 g blended eggs mixed with 1 gram of salt. Started timer and cook eggs, while stirring, for 1 minute. Remove to plate.

Using the technical observations above, the food preparation composition of the present invention can provide as good or better non-stick performance across all usage levels and food types compared to the conventional oil. The food preparation composition of the present invention can also provide a reduction of splattering in cooking of relatively moist foods (chicken and mushrooms) regardless of usage level relative to the conventional oil.

EXAMPLES

The following examples are illustrative of the present invention, but are not meant to be limiting thereof.

Example 1

Food Preparation Composition with Gelled Oil Base

The following example illustrates a food preparation composition having a gelled oil base.

Materials and Formula

A food preparation composition (about 14 kilograms) according to the present invention can be made according to the following procedure:

First, a gel matrix is formed using the following formula:

| Gel Matrix: | | |
|---|---|---|
| | % wt. | Grams |
| Oil (Crisco ® Natural Blend brand lot #8344A) | 73 | 10,220 |
| Sunflower Oil (Wesson ® brand lot #M8C8) | 25 | 3500 |
| Silicon Dioxide powder (Aerosil ® 380 brand from Degussa, Lot #B06227D) | 2 | 280 |

Procedure

Balance: Mettler PC 16 (SW 13172)

1. Weigh, into a 5 gallon plastic bucket, the Crisco® Natural Blend. Add in the Sunflower oil and finally weigh in the Aerosil® silica. Record actual amounts of each component added.
2. Mix components using a Lightnin® Series 30 mixer, equipped with a 2.5 inch, 4 blade, high pitch propeller, operating at a speed setting of 40 for 2 minutes until all of the silica is wetted.
3. Reduce speed setting to 25, to reduce surface turbulence, and continue stirring for an additional 10 minutes to assure all silica lumps are dissolved and the mixture is uniform.
4. Next, process the mixture through a Gaulin® Homogenizer (Type: 15M8TA; S/N 1818551) using 6000 psi to press through orifice (Product exit temperature=115° F.), collecting product in stainless steel bucket. Cover with aluminum foil until the gel matrix is used in the following step:

The food preparation composition is then prepared using the following formula:

|  | % wt. | Grams |
|---|---|---|
| Gelled Oil (from above) | 95.45 | 13100 |
| Lecithin (Centrophase ® 152 brand from Central Soya, Lot #98155208) | 3.50 | 480.4 |
| Oxoacid and dairy diglyceride combination (Firmenich; Lot #3709261.16NII) | 0.25 | 34.3 |
| Ottens Browned Butter Flavor (Ottens Flavor #6913) | 0.0026 | 0.4 |
| Ribotide ® (Takeda, Lot #PY07A) | 0.80 | 110.0 |

Procedure
Balance: Mettler PC 16 (SW 13172))
1. Transfer the gelled oil (above product) to a tared 5 gallon plastic bucket Weigh in the lecithin, oxoacid and dairy diglyceride, and the browned butter flavor according to the formula above. Record actual weights of each component added.
2. Mix components using a Lightnin® Series 30 mixer, equipped with a 2.5 inch, 4 blade, high pitch propeller, operating at a speed setting of 30 for 2 minutes to blend components.
3. Slowly add the Ribotide®, avoiding clumping, while the mixture is stirred at a speed setting of 30. Addition time: 4.5 minutes.
4. Reduce mixer speed setting to 20 to reduce the work being put into the gelled oil.

Example 2

Food Preparation Composition Using a Wax as the Suspending Agent for the Flavor Enhancer A second embodiment of the invention (about a 300 gram batch) can be made according to the following example:

|  | % | Weight (g) |
|---|---|---|
| Vegetable Oil (Crisco ® Natural Blend brand) | 94.95 | 284.85 |
| Lecithin (Centrophase 152 (6004) Central Soya) | 3.50 | 10.50 |
| Ribotide ® (Takeda) | 0.80 | 2.40 |
| Wax (Polyethylene Homopolymers, Baker Petreolite X-2068) (batch #SS37774) | 0.75 | 2.25 |

Procedure
Heat the combined ingredients in a 250° F. oven for 30 minutes to completely melt wax.
1. Weigh the above four ingredients into a 1 L beaker using a two-place balance.
2. Heat the combined ingredients in a 250° F. oven for 30 minutes to completely melt was.
3. Stir with glass rod to completely mix the four ingredients.
4. Rapidly crystallize mixture by pouring evenly onto a 32° F. baking sheet (18"×26"×1"). This temperature is maintained by placing one sheet over a second sheet containing a water and ice mixture. Total crystallization is 5 minutes.
5. Scrape sample from pan using rubber spatula.

The final product is pourable at room temperature.

Example 3

Food Preparation Composition Using Hardstock Triglyceride as the Suspending Agent for the Flavor Enhancer This example illustrates an embodiment of the present invention wherein the food preparation composition comprises a base of liquid shortening.

Formulation:

| Ingredient | % | Wt (grams) |
|---|---|---|
| Frymax ® Brand Liquid Shortening Lot 092298D (or equivalent; Frymax ® is a blend of 96% touch hardened soybean oil with an Iodine Value of about 107/4% fully hardened soybean oil with an Iodine Value of about 4 or less/5.5 ppm polydimethylsilane) | 95.45 | 381.8 |
| Lecithin Centrophase 152 (6004) Lot 98155208 | 3.5 | 14.0 |
| Ribotide (Takeda Lot PY07A) | 0.8 | 3.20 |
| Mouthfeel Flavor (Firmenich Lot 3709261.16NII) | 0.25 | 1.0 |
| Butter Flavor (Otten Lot 6913) | 0.0026 | 0.01 |

Procedure
1. Weigh all the above ingredients except the Ribotide® into a 1 L stainless steel beaker using a two-place balance.
2. Mix for 2 minutes at speed setting of 30 on a Lightnin® series 30 mixer.
3. Slowly add the Ribotide into the mixture over a 30 second period and mix an additional 5 minutes at the same speed setting as Step 2.
4. Pour the material into glass sample jar or other appropriate storage container.

Example 4

Food Preparation Composition Consisting of an Oil in Water Emulsion Base

| Ingredient | % composition | Grams |
|---|---|---|
| Modified frozen egg yolk - Emulsa ® brand (Canadian Inovatech Inc., Lot #W150199) | 2.5 | 7.5 |
| Lecithin - Centrolex ® F brand (6450) (Central Soya, Lot #97363-1-10) | 2 | 6.0 |
| Water | 35.1 | 105.3 |
| 10% Ribotide ® solution | 8 | 24.0 |
| Salt | 2 | 6.0 |
| Potassium Sorbate | 0.04 | 0.12 |
| Sodium Hexametaphosphate avg. chain length 13 | 0.15 | 0.45 |

-continued

| Ingredient | % composition | Grams |
|---|---|---|
| Vegetable oil Crisco Natural Blend (Lot #8344A) | 49.96 | blend of vegetable oil, oxoacid & dairy diglyceride (from Step 3 below), and butter flavor is added at 150.8 g |
| Oxoacid & dairy diglyceride (Firmenich, Lot #709261.16NII) | 0.25 | |
| Butter Flavor (Firmenich, Lot #709261.16NI) | 0.0026 | |

Procedure

1. Prepare a solution of 10% Ribotide® (Takeda, Lot #PY07A) in water (3.0 g Ribotide®+27.0 g water).
2. Prepare a 0.26% solution of Butter Flavor in Crisco® Natural Blend oil (0.26 g Butter Flavor+99.74 g oil).
3. Prepare the oil phase—a blend of Crisco® Natural Blend oil (490.0 g=97.51%), Diglyceride (2.5 g=0.50%), and 0.26% Butter Flavor in oil solution (10.0 g=1.99%).
4. Combine frozen Emulsa with water. Set aside for about 10 minutes to allow Emulsa to thaw and be dispersed. Added Centrolex® F and allow to hydrate for approximately 10 minutes.
5. Add Ribotide® solution, salt, potassium sorbate, and sodium hexametaphosphate. The aqueous phase is blended slowly with a Janke & Kunkel Ultra Turrax® mixer (Model #SD-45) to break up and dissolve remaining solids.
6. Oil phase is weighed out and added to the aqueous phase while high shearing with the Ultra Turrax® (variac setting=100) for two minutes and 30 seconds.
7. Process the blend one pass through a microfluidizer (Microfluidics Corporation, Newton, Mass., Model #110T) at a pressure of 8000 psi.

Example 5

Sauteed Chicken

Sautéed chicken is prepared using the Technical Cooking Test Method found in Section 6 of the Test Methods Section herein. Two different food preparations compositions are used for cooking the chicken along with two conventional oil controls.

A) Food preparation composition of Invention (Example 3) 10.5 grams
B) Conventional Oil 21.0 grams (twice the amount of A)
C) Food preparation composition of Invention (Example 1) 10.5 grams
D) Conventional Oil 21.0 grams (twice the amount of C)

Double blind testing is done among sensory panelists trained on test methodologies and screened for ability to discriminate tastes and aromas. Each taste test panelist is asked to taste two different samples of sauteed chicken. Before and after each tasting, panelists cleanse their palates by eating an unsalted cracker and drinking water. After tasting each sample of sauteed chicken, panelists can record their evaluation on a questionnaire. A higher number means more of that attribute. In the table below, letters next to numbers represent significant differences (95% Confidence Level). For example, in Test 1, Invention A, the letter "B" next to the Overall Flavor score of 6.2 means that Invention A has a significantly different score for Overall Flavor in comparison to Control Product B.

| BASE | TEST 1 | | TEST 2 | |
|---|---|---|---|---|
| | Example 3 (A) | Control Product (Oil) (B) | Example 1 (C) | Control Product (Oil) (D) |
| | (n = 36) | | (n = 27) | |
| ATTRIBUTE | | | | |
| Initial Flavor Impact | N/A | N/A | 5.7 D | 4.9 |
| Overall Flavor | 6.2 B | 5.6 | 6.0 | 5.5 |
| Chicken Flavor | 6.2 B | 5.7 | 6.2 D | 5.6 |
| Savory Flavor | 5.6 B | 4.7 | 5.5 | 4.9 |
| Lingering/Flavor - Makes You Want More | 4.9 B | 4.3 | 5.4 D | 4.6 |
| Off Flavor | 1.5 | 1.4 | 1.1 | 1.2 |
| Moistness | N/A | N/A | 5.9 D | 5.2 |
| Overall Acceptance (Liking) | 6.9 B | 6.4 | 6.8 D | 6.3 |

The results under Test 1 above show that the food preparation composition of Example 3, used at half the level of conventional cooking oil, provides significantly higher overall flavor, chicken flavor, savory flavor, lingering flavor, and a significantly higher acceptability rating versus the conventional oil.

The results under Test 2 above show that the food preparation composition of Example 1, used at half the level of conventional oil, provides significantly higher initial flavor impact, chicken flavor, lingering/flavor, moistness, and a significantly higher acceptability rating versus the conventional oil.

Example 6

Salad Dressing

Samples of salad dressing are prepared using conventional oil and the current invention of Example 3 above.

The samples are compared to detect flavor differences between the two samples. The samples are prepared using the following procedure:

For each sample, weigh the following ingredients into 1 quart glass jar in this order: white vinegar (60 g), water (30 g), contents of Good Seasons® brand Italian dressing packet (19 g). Cover with lid and shake well (invert 10 times after adding packet).

To one sample add 146 grams of conventional cooking oil. To the other sample add 73.5 grams of the food preparation composition of the present invention.

Shake vigorously to mix oil and water (invert 10 times).

The finished appearance of the oil dressing is the typical Italian dressing that separates quickly into two phrases. The salad dressing made with the food preparation composition of the current invention is fully homogenized, does not separate into two phrases, and has the appearance of a creamy Italian or Ranch dressing.

The two samples are applied to lettuce in the conventional manner prior to testing. The salad prepared with the dressing comprising the present invention has a significantly higher flavor perception, cleaner flavor and less greasy mouthfeel than the salad prepared with dressing comprising conventional oil.

Example 7

Yellow Cake

This example compares yellow cakes prepared with conventional oil and with the food preparation composition of the present invention according to Examples 1 and 3 above, and examples 9 and 10 below.

Cakes are prepared using Duncan Hines® brand yellow cake mix according to the box recipe. The cakes are prepared using 1 package of the cake mix, 3 eggs, 1 and ⅓ cup water. One cake is prepared with ⅓ cup of conventional oil, and the other cakes are prepared with ⅙ cup of food preparation composition of the present invention (Examples 1 and 3). The ingredients are blended for 30 seconds, then beat at medium speed for 2 minutes. The batter is poured into an 8" cake pan and baked at 350° F. 33–36 minutes. The finished cakes made with the compositions of the present invention have essentially equal taste, texture, and color attributes as the cake made with twice the level of conventional oil.

Example 8

Sautéed Mushrooms and Hash Brown Potatoes

This Example illustrates the reduced fat content of foods prepared with the present invention compared to the same foods prepared with convention oil (Crisco® Natural Blend brand). Sautéed mushrooms and hash brown potatoes are prepared using the Technical Cooking Test Method found in Section 6 of the Test Methods Section herein.

The following table illustrates the Fat content of the foods prepared with the conventional oil and food preparation compositions according to the present invention. The fat content of the mushrooms and hashbrowns can be analyzed for total %fat by the American Association of Cereal Chemists Approved Method #30-10, which method is incorporated herein by reference

| FOOD TYPE | FOOD PREPARATION COMPOSITION | AMOUNT | % FAT |
|---|---|---|---|
| Mushrooms | Conventional Oil | 21 grams | 10.2 |
| Mushrooms | EXAMPLE 1 | 10.5 grams | 5.1 |
| Mushrooms | EXAMPLE 3 | 10.5 grams | 6.2 |
| Hash brown potatoes | Conventional Oil | 21 grams | 13.8 |
| Hash brown potatoes | EXAMPLE 1 | 10.5 grams | 6.9 |
| Hash brown potatoes | EXAMPLE 3 | 10.5 grams | 7.7 |

Sauteed mushrooms made with the present invention can have more overall/savory flavor less greasy mouthfeel, and comparable texture relative to those made with conventional oil. Hash brown potatoes made with the invention can have less greasy mouthfeel, and similar overall/savory flavor, as compared to hash browns made with conventional oil.

Example 9

Food Preparation Composition Using a Silicone as an Anti-Foaming Agent

Formulation:

| Component | Percentage | Weight (pounds) |
|---|---|---|
| Crisco ® Natural Blend Vegetable Oil | 68.7 | 274.8 |
| Sunflower Oil | 25 | 100 |
| Lecithin - Centrophase ® HR | 3.5 | 14 |
| Aerosil ® 380 Fumed Silica | 2.0 | 8 |
| Ribotide ® | 0.8 | 3.2 |
| Ottens Brown Butter ® #6913 O.S. | 0.0026 | 0.01 |
| Dow Corning ® 200 Fluid (Silicone) | 10 ppm | 0.004 |

Procedure

1. Weigh the oils, fumed silica, and silicone into a mixing vessel. Thoroughly mix all the ingredients together.
2. Process the mixture through a Gaulin® Type 15M8TA Homogenizer using 6000 psi pressure.
3. Cool material to 70 to 80° F.
4. In a well agitated tank add the Ribotide®, lecithin, and butter flavor to the processed oil and mix thoroughly for ten minutes.
5. Package material.

Example 10

Food Preparation Composition Using a Reduced Level of Lecithin and a Silicone as Antifoaming Agents

| Component | Percentage | Weight (pounds) |
|---|---|---|
| Crisco Natural Blend oil | 70.2 | 280.8 |
| Sunflower oil | 25 | 100 |
| Centrophase HR lecithin | 2.0 | 8.0 |
| Aerosil 380 Fumed Silica | 2.0 | 8.0 |
| Ribotide | 0.8 | 3.2 |
| Ottens Brown butter #6913 O.S. | 0.0026 | 0.010 |
| Dow Corning 200 | 10 ppm | 0.004 |

Procedure: Same as Example 9, above

Example 11

Food Preparation Composition Using a Combination of Phosphatidic Acid Salts and Lecithin as Part of the Antistick Agent Package Formulation:

| Component | Percentage | Weight (pounds) |
|---|---|---|
| Crisco Natural Blend Oil | 71.0 | 274.8 |
| Sunflower Oil | 25 | 100 |
| Phosphatidic Acid Salt | 1.2 | 4.6 |
| Aerosil 380 Fumed Silica | 2.0 | 8 |
| Ribotide | 0.8 | 3.2 |
| Ottens Brown Butter #6913 O.S. | 0.0026 | 0.01 |
| Dow Corning 200 Silicone Fluid | 10 ppm | 0.004 |

Example 12

Food Preparation Composition Using a Reduced Level of Lecithin and a Silicone as Antifoaming Agents Formulation:

| Component | Percentage | Weight (pounds) |
|---|---|---|
| Crisco Natural Blend Oil | 70.2 | 280.8 |
| Sunflower Oil | 25 | 100 |
| Phosphatidic Acid Salt* | 0.5 | 1.97 |
| Aerosil 380 Fumed Silica | 2.0 | 7.80 |
| Dow Corning 200 | 0.001 | 0.004 |

*Made by the process described in U.S. Pat. No. 5,813,750 using the enzymatic hydrolysis of lecithin.

Procedure

1. Weigh the oils, fumed silica, and silicone into a well agitated tank. Thoroughly mix all the ingredients together.
2. Process the mixture through a Gaulin® Type 15M8TA Homogenizer using 6000 psi pressure.
3. Cool material to 70 to 80° F.
4. Package material.

Example 13

Food Preparation Composition Using a Combination of Phosphatidic Acid Salts and Lecithin as Part of the Antistick Agent Package

| Formulation: | | |
|---|---|---|
| Component | Percentage | Weight (pounds) |
| Crisco Natural Blend Oil | 70.3 | 271.2 |
| Sunflower Oil | 25.0 | 96.5 |
| Centrophase 152 | 0.5 | 1.8 |
| LamChem PE-130 (Phosphatidic Acid Salt) | 1.5 | 5.5 |
| Aerosil 380 Fumed Silica | 2.0 | 7.7 |
| Ribotide | 0.8 | 2.9 |
| Ottens Brown Butter #6913 O.S. | 0.0026 | 0.01 |
| Dow Corning 200 Silicone Fluid | 10 ppm | 0.004 |

Procedure: Same as Example 12 above

Example 14

Reduction in Splatter when Using the Oil of the Current Invention

Chicken, mushrooms and potatoes are prepared using the Splatter Test Method found in Section 3 of the Test Methods Section herein. The amount of oil that splattered out of the skillet and onto the aluminum foil is determined by weighing the foil before and after cooking. Three replicates of each food in each type of oil are run and the results averaged.

| Food Cooked | Oil Of Example 9 (10.5 g) | Conventional Triglyceride (21.0 g) | Conventional Triglyceride (10.5 g) |
|---|---|---|---|
| Chicken | 0.15 g or 1.4%* | 2.64 g or 12.6% | 0.73 g or 6.9% |
| Mushrooms | 0.11 g or 1.0% | 0.31 g or 1.5% | 0.10 g or 1.0% |
| Potatoes | 0.04 g or 0.4% | 0.17 g or 0.8% | 0.10 g or 1.0% |

*The first number is the splatter score and the second number is the percentage of the starting oil that left the pan and is recovered on the foil.

There is a significant reduction in splatter for the food preparation composition of this invention in certain applications. The reduction in splatter is greatest for foods that do not absorb much oil during cooking such as the chicken pieces used in this experiment.

Example 15

The Effect of Lecithin Level on Foaming

A series of samples were prepared based on the composition of the food preparation composition from Example 8 except the level of HR lecithin was varied from 2.0% to 3.5%. The concentrations of all other components are kept constant. The food preparation compositions are evaluated for foaming utilizing the Pan Foaming Test Method described in the Test Methods Section. The results appear in the Table below.

| | Millimeters of Foam Generated | | | | | |
|---|---|---|---|---|---|---|
| | Percent HR Lecithin→ | | | | | |
| Time (seconds) | 2% | 2.25 | 2.5 | 2.75 | 3 | 3.5 |
| 30 | 0 | 0 | 12 | 15 | 20 | 26 |
| 120 | 0 | 0 | 10 | 7 | 12 | 16 |

The results indicate that the level of foaming is proportional to the level of HR lecithin. For reference, conventional cooking oil does not foam at all in this test. A food preparation composition with 2% fumed silica and 10 ppm polydimethylsiloxane will not foam up to a level of 2.25% HR lecithin in the formula.

Example 16

The Effect of Silica and Polydimethylsiloxane on Foaming

The following samples are prepared using Crisco Natural Blend as the base oil.

| Lecithin | Polydimethyl Siloxane | Fumed Silica | Foam Score |
|---|---|---|---|
| No Added Lecithin* | None | None | 0 |
| HR, 2% | None | None | Foams out of skillet |
| HR, 2% | 10 ppm | None | >30 mm |
| HR, 2% | None | 2% | 5–30 mm |
| HR, 2% | 10 ppm | 2% | 0 |

*This sample is conventional cooking oil with no added components.

The results indicate that adding 2% HR lecithin to conventional oil will cause very high levels of foam. The addition of 10 ppm of polydimethyl siloxane reduces the level of foam to a some extent but foaming levels are still very high and could be unsafe. The addition of silica by itself has a more beneficial effect than adding polydimethylsiloxane by itself and brings the level of foaming into an acceptable range as discussed in the Detailed Description Of The Invention Section. Finally, the combination of silica and polydimethyl siloxane makes the HR formulation foam no more than conventional cooking oil foams.

Example 17

A Comparison of the No-Stick Performance of the Composition of this Invention vs. Conventional Oil and Cooking Spray The cooking compositions of Examples 9, 10 and 13 were evaluated using the Egg Stick Measurement Test and the Bread Release Test Method described in the Test Methods Section. For comparison, conventional oil (Crisco Natural Blend) and two commercially available cooking sprays (Pam® and Crisco) were also evaluated in the same tests. The results appear in the Table below:

| NO-STICK PERFORMANCE | | |
| --- | --- | --- |
| FORMULA | EGG STICK | BREAD RELEASE |
| OIL | 2.8 | 33.8% |
| Composition From Example 9 | 9.6 | 0.658 |
| Composition From Example 10 | 8.9 | 0.489 |
| Composition From Example 13 | 9.8 | 0.341 |
| CRISCO COOKING SPRAY UPGRADE | 10 | 0.513 |
| PAM COOKING SPRAY | 9.8 | 0.222 |

The results show that conventional oil failed in both the egg stick test and in the bake release test. The compositions of the current invention, however, perform much better than oil and about as well as two commercially available cooking sprays designed to maximize anti-stick performance.

Example 18

Comparison of Browning of Compositions of the Present Invention with a Commercially Available Cooking Spray The cooking compositions of Examples 9 is evaluated using the browning test method described in the Test Methods Section. For comparison, a commercially available cooking spray (Pam is also evaluated in the same tests. The results appear in the Table below:

| Browning Performance | |
| --- | --- |
| Composition | Browning Score |
| Example 9 | 21 |
| Example 13 | 19 |
| Pam Cooking Spray | 43 |

The results show that compositions of the present invention brown much less than commercially available cooking sprays and fall within a range that is considered acceptable by consumers.

INCORPORATION BY REFERENCE

All of the aforementioned patents, publications, and other references are herein incorporated by reference in their entirety. Also incorporated by reference are the following: WO9610927, published Apr. 18, 1996; WO9534222, published Dec. 21, 1995; WO9641789, published Dec. 27, 1996; WO9704667, published Feb. 13, 1997; WO9843497, published Oct. 8, 1998; U.S. Pat. Nos. 5,780,090; and 5,695,802.

What is claimed is:

1. A process for preparing a food preparation composition in the form of a stable gel, comprising the steps of:
   (a) providing an oil base;
   (b) adding from about 1.5% to about 2.2% silica to the oil base, wherein the silica comprises less than about 3.5% moisture;
   (c) mixing the silica with the oil base to form a mixture;
   (d) homogenizing the mixture;
   (e) cooling the mixture; and
   (f) thoroughly mixing into the mixture at least one additional ingredient to form said food preparation composition.

2. The process of claim 1, wherein said oil base comprises triglyceride, diglyceride, or mixtures thereof.

3. The process of claim 1, wherein said oil base comprises an oil substitute.

4. The process of claim 1, wherein step (b) comprises adding from about 1.8% to about 2% silica to the oil base.

5. The process of claim 1, wherein step (d) comprises homogenization at a pressure of at least about 2000 psi.

6. The process of claim 4, wherein step (d) comprises homogenization at a pressure of at least about 2000 psi.

7. The process of claim 6, wherein step (e) comprises cooling to from about 70° F. to about 80° F.

8. The process of claim 6, wherein the additional ingredient of step (f) comprises a flavor enhancing agent, lecithin, silicone polymer, or mixtures thereof.

9. The process of claim 6, wherein said flavor enhancing agent has an average particle size of less than about 30 microns.

10. The process of claim 9, wherein said flavor enhancing agent has an average particle size of less than about 10 microns.

11. The process of claim 4, wherein said flavor enhancing agent has an average particle size of less than about 30 microns.

12. The process of claim 11, wherein said flavor enhancing agent has an average particle size of less than about 10 microns.

13. The process of claim 4, wherein step (e) comprises cooling to from about 70° F. to about 80° F.

14. The process of claim 4, wherein the additional ingredient of step (f) comprises a flavor enhancing agent, lecithin, silicone polymer, or mixtures thereof.

15. The process of claim 1, wherein step (e) comprises cooling to from about 70° F. to about 80° F.

16. The process of claim 15, wherein the additional ingredient of step (f) comprises a flavor enhancing agent, lecithin, silicone polymer, or mixtures thereof.

17. The process of claim 15, wherein said flavor enhancing agent has an average particle size of less than about 30 microns.

18. The process of claim 17, wherein said flavor enhancing agent has an average particle size of less than about 10 microns.

19. The process of claim 1, wherein the additional ingredient of step (f) comprises a flavor enhancing agent, lecithin, silicone polymer, or mixtures thereof.

20. The process of claim 1, wherein said flavor enhancing agent has an average particle size of less than about 30 microns.

21. The process of claim 20, wherein said flavor enhancing agent has an average particle size of less than about 10 microns.

22. A process for preparing a food preparation composition in the form of a stable gel, comprising the steps of:
   (a) providing an oil base;
   (b) adding from about 1.5% to about 2.2% silica to the oil base;
   (c) mixing the silica with the oil base to form a mixture;
   (d) homogenizing the mixture at a pressure of at least about 2000 psi;
   (e) cooling the mixture; and
   (f) thoroughly mixing into the mixture at least one additional ingredient to form said food preparation composition.

23. The process of claim 22 wherein step (b) comprises adding from about 1.8% to about 2% silica to the oil base.

24. The process of claim 23, wherein the silica of step (b) comprises less than about 3.5% moisture.

25. The process of claim 24, wherein step (d) comprises homogenization at a pressure of at least about 2000 psi.

26. The process of claim 24, wherein step (e) comprises cooling to from about 70° F. to about 80° F.

27. The process of claim 24, wherein the additional ingredient of step (f) comprises a flavor enhancing agent, lecithin, silicone polymer, or mixtures thereof.

28. The process of claim 24, wherein said flavor enhancing agent has an average particle size of less than about 30 microns.

29. The process of claim 28, wherein said flavor enhancing agent has an average particle size of less than about 10 microns.

30. The process of claim 22, wherein the silica of step (b) comprises less than about 3.5% moisture.

31. A process for preparing a food preparation composition in the form of a stable gel, comprising the steps of:
    (a) providing an oil base;
    (b) adding from about 1.5% to about 2.2% silica to the oil base;
    (c) mixing the silica with the oil base to form a mixture;
    (d) homogenizing the mixture;
    (e) cooling the mixture; and
    (f) thoroughly mixing into the mixture at least one additional ingredient, wherein said additional ingredient is selected from lecithin, silicone polymer, and mixtures thereof, to form said food,preparation composition.

32. The process of claim 31 wherein the additional ingredient of step (f) further comprises a flavor-enhancing agent.

* * * * *